United States Patent [19]

Lang et al.

[11] 4,150,947
[45] Apr. 24, 1979

[54] STABLE, CONCENTRATED DISPERSIONS OF BASIC DYESTUFFS

[75] Inventors: Walter Lang, Pfeffingen; Rémy Jeanneret, Allschwil; Anton Kaiser, Basel, all of Switzerland

[73] Assignee: Ciba-Geigy AG, Basel, Switzerland

[21] Appl. No.: 694,874

[22] Filed: Jun. 11, 1976

Related U.S. Application Data

[63] Continuation of Ser. No. 548,046, Feb. 7, 1975, abandoned, which is a continuation of Ser. No. 427,890, Dec. 26, 1973, abandoned, which is a continuation of Ser. No. 205,722, Dec. 7, 1971, abandoned, which is a continuation of Ser. No. 800,776, Feb. 19, 1969, abandoned.

[30] Foreign Application Priority Data

Mar. 1, 1968 [CH] Switzerland .......................... 3084/68

[51] Int. Cl.$^2$ ................................ D06P 1/64
[52] U.S. Cl. ................................ 8/93; 8/79; 8/173
[58] Field of Search .................. 8/79, 173, 177 AB, 93

[56] References Cited

U.S. PATENT DOCUMENTS

| | | | |
|---|---|---|---|
| 1,687,751 | 10/1928 | David | 8/79 |
| 2,181,800 | 11/1939 | Crossley | 8/79 |
| 2,764,466 | 9/1956 | Bigood | 8/21 A |
| 2,773,056 | 9/1954 | Helfaer | 260/208 A |
| 2,982,597 | 5/1961 | Salven | 8/165 |
| 3,070,418 | 12/1962 | Bann | 8/79 |
| 3,265,461 | 8/1966 | Luetzel | 8/84 |
| 3,346,322 | 10/1967 | Finkenauer | 8/70 |
| 3,617,183 | 11/1971 | Grosklos | 8/97 |
| 3,770,371 | 11/1973 | Bossard | 8/79 |

FOREIGN PATENT DOCUMENTS

| | | | |
|---|---|---|---|
| 505940 | 9/1954 | Canada | 8/79 |
| 699733 | 6/1967 | France | 8/79 |
| 31382 | 3/1944 | Poland | 8/79 |
| 775766 | 5/1957 | United Kingdom | 8/79 |
| 980923 | 1/1965 | United Kingdom | 8/79 |

OTHER PUBLICATIONS

Diserens, Die neuesten Fortschritt in der Anwendung der Farbstoffe, 1st vol. 1949, p. 132, pub. by Vedag Burkehausle Basel.
Fierz-David Fundamental Processes of Dye Chemistry, pp. 377–378, Pub. 1949, by Interscience Pub. N.Y.C.

*Primary Examiner*—Donald Levy
*Attorney, Agent, or Firm*—Edward McC. Roberts

[57] ABSTRACT

The invention relates to a dispersion of a water-soluble basic dyestuff in an organic solvent that is at least partially miscible with water or in a mixture of such a solvent with water.

13 Claims, No Drawings

STABLE, CONCENTRATED DISPERSIONS OF BASIC DYESTUFFS

This is a continuation of application Ser. No. 548,046, filed on Feb. 7, 1975, now abandoned, which is a continuation of application Ser. No. 427,890, filed on Dec. 26, 1973, now abandoned, which is a continuation of application Ser. No. 205,722, filed on Dec. 7, 1971, now abandoned, which is a continuation of application Ser. No. 800,776, filed on Feb. 19, 1969, now abandoned.

The practice of using basic dyestuffs in the form of concentrated stock solutions is known. By so doing, certain disadvantages may be overcome which are associated with the use of the dyestuffs in the form of finely ground powders, for example, formation of dust, difficulties in dissolving, formation of foam, and so forth. Furthermore, dyestuffs in liquid form have a lower transport volume and they are more easily measured or metered quantitatively for application. On account of the low solubility of some of the common salts of basic dyestuffs, it is advantageous to use salts which contain anions of water-soluble carboxylic acids for the preparation of concentrated heat and frost-resistant stock solutions.

Water-soluble polyhydric alcohols which are liquid at room temperature, or ethers thereof, or water-soluble polyethers, may be used as solubilizers and, if desired, also as solvents. Substances that are specially suitable are dihydric and trihydric alcohols and low-molecular-weight ethers thereof, for example, ethylene glycol, diethylene glycol, ethylene glycol monoethyl ether, diethylene glycol monoethyl ether, diethylene glycol monoethyl ether acetate, diethylene glycol monobutyl ether, triethylene glycol monobutyl ether, triethylene glycol, dipropylene glycol, glycerol and glycerol-1,3-diethyl ether. The following have also been proposed as solubilizers: water-soluble liquid amides, lactams, lactones or nitriles that may contain hydroxyl groups, for example, formamide, dimethylformamide, N-methylpyrrolidone, butyrolactone, acetonitrile or β-hydroxypropionitrile. Other liquid compounds may also be used as solubilizers, or, if desired, at the same time as solvents, for example, ethyl lactate, ethyloxybutyrate, diacetone alcohol, tetrahydrofurfuryl alcohol, acetonyl acetone, sulpholan, dimethyl sulphoxide, tetrahydrofuran or dioxane; solid compounds may also be used, for example, caprolactam.

The above-mentioned solubilizers may also serve at the same time as solvents, but additional solvents may also be used, for example, water, glacial acetic acid or formic acid, or mixtures thereof.

This invention is based on the observation that it is advantageous in many cases to use the basic dyestuff in the form of a dispersion, especially when the preparation of stable highly concentrated solutions is accompanied with difficulties because of low solubility or low resistance to hydrolysis. Accordingly, this invention provides new, stable, concentrated dispersions of basic dyestuffs and a process for their preparation. The dispersion media used include the above-mentioned solubilizers or mixtures thereof, or mixtures of the said solubilizers with other organic solvents, or, for example, with 5 to 20 percent of water. Basic dyestuffs belonging to a wide variety of classes may be used in the preparation of the dispersions of the invention, for example, dyestuffs of the following series: nitroso, nitro, styryl, stilbene, diarylmethane, triarylmethane, methine, polymethine, sulphur, anthraquinone, quinoneimine, azine, oxazine, diazine, perinone, naphthoquinone, indigo, quinophthalone, pyrazolone, xanthene, acridine, quinoline, cyanine, phthalocyanine, azomethine or especially the monoazo, disazo or polyazo dyestuffs. Those dyestuffs, which are free from acidic groups imparting solubility in water, especially sulphonic acid and carboxylic acid groups, are advantageously applied in the form of their usual salts, for example, in the form of phosphates, sulphates, nitrates, arylsulphonates or halides, or also in the form of acetates, it being essential that the dyestuffs be as pure as possible, that is to say, free from inorganic salts.

When preparing the dispersions of the invention, care must be taken to ensure that the particle size of the dyestuff is such that no sedimentation or gelling can take place during a prolonged period of time, for example, for two or more months, even at a temperature of 40° C.; the most that can be tolerated is a tendency to thixotropy. A mean particle size of 0.1 to 20μ is advantageous. The most advantageous way of preparing the new dispersions is to subject the basic dyestuff or, if desired, a mixture of basic dyestuffs, to a mechanical treatment in the presence of grinding elements and subsequently to remove the latter. The grinding elements to be used in accordance with this invention must be capable of being removed from the above-mentioned media, that is to say, they must not be soluble or show any significant degree of solubility in the grinding medium, nor must they react with it chemically. Since, in contrast to dispersions of water-insoluble dyestuffs, removal of the grinding elements by washing out, that is to say, the use of water-soluble grinding elements, is not possible, separation is preferably effected by exploitation of the difference in particle size, particularly by sifting or filtration. Accordingly, suitable grinding elements are primarily those having considerably larger dimensions than the dyestuff agglomerates; that is to say, grinding is advantageously carried out in a ball mill, attrition mill or especially a sand mill. In some cases, the material may be subjected to preliminary grinding in a coarser type of unit.

In special cases it can be advantageous to add surfactants to the grinding media, but only non-ionic cationic surfactants may be used. If desired, a small amount of antifoaming agent may be added, for example 0.1 to 3 percent.

Grinding is advantageously carried out at room temperature, or at most at a slightly elevated temperature, if necessary with efficient cooling. This mechanical processing yields a fine dispersion of the basic dyestuff in the grinding medium, the dispersion still containing the grinding elements. The grinding elements are advantageously removed by straining or suction filtration. The ratio between dyestuff and liquid grinding medium and the ratio between dyestuff and grinding elements may vary within relatively wide limits. A comparatively small proportion of grinding element, for example, about one fifth of the material to be ground, means that processing has to be carried out for too long a period. It is advantageous to use equal proportions of grinding element and material; generally, the amount of grinding element used should not exceed five times the amount of material, because otherwise the viscosity of the batch would be unfavourably influenced.

The ratio between dyestuff and liquid is advantageously such that the dispersions of the invention contain the dyestuff in a high concentration, for example, of the order of 10 to 80, preferably 10 to 50, percent by weight.

Notwithstanding the high concentration of dyestuff, the dispersions of the invention remain stable when allowed to stand for a period of time. They advantageously have a viscosity of about 100 to 250 cp at 20° C. (measured by means of a "Visospatel" according to Rossmann), are miscible with water in all proportions or also partly with suitable organic solvents, and can easily be metered volumetrically. Their boiling point is advantageously not below 80° C. and preferably not below 100° C. The dispersions of the invention are primarily suitable for the preparation of dyeing solutions for paper and especially textile fibres, dyeing carried out by methods normally used for basic dyestuffs. They are also suitable for other purposes, for example, they may be used in the preparation of inks or printing inks for recording instruments, stamp pads, typewriter ribbons, and so forth.

The following examples illustrate the invention. Unless otherwise stated, the parts and percentages are by weight.

EXAMPLE 1

310 Parts of the dry and ground blue dyestuff Colour Index Basic Blue 80 are added to 582 parts of ethylene glycol (0.1% $H_2O$ content). When wetting is complete, the batch is ground in a wet mill until it can pass through a sieve having a mesh size of 0.2 mm. The suspension is then ground in a sand mill for 24 hours. The increase in viscosity which takes place is continuously compensated by the addition of a total amount of 1092 parts of ethylene glycol in a manner such that the temperature does not exceed 48° C.

The suspension so prepared remains chemically and physically stable even after storage for one year at temperatures between −20 and +60° C. A suspension having twice the tinctorial strength and similar properties may be obtained by replacing the total of 1674 parts of ethylene glycol with 682 parts of 1,2-propylene glycol or triethylene glycol as grinding medium and following the procedure described above.

EXAMPLE 2

52 Parts of the dry blue drystuff Colour Index Basic Blue 22 and 98 parts of diethylene glycol are ground together for 2 hours in a sand mill. The dyestuff suspension so obtained remains stable for several months even at a temperature of 60° C.

Preparations having similar properties are obtained when grinding is carried out in triethylene glycol or formamide.

A prepartion having half the tinctorial strength and similar properties may be obtained by grinding for the same period in 248 parts of ethylene glycol as suspension medium.

EXAMPLE 3

52 Parts of the dry claret dyestuff Colour Index Basic Red 59 ground for 6 hours in a sand mill in 98 parts of ethylene glycol. A liquid preparation is obtained that remains chemically and physically stable for several months at temperatures between −20 and +60° C.

Preparations having similar properties may be obtained by replacing the ethylene glycol with the same amount of 1,2-propylene glycol or triethylene glycol and following the procedure described above.

EXAMPLE 4

130 Parts of the dry orange-yellow dyestuff Colour Index Basic Orange 43 are added to 170 parts of diethylene glycol and the mixture is ground for 12 hours in a sand mill. The suspension so obtained remains chemically and physically stable for several months even at an elevated temperature (60° C.).

EXAMPLE 5

67 Parts of the dry red dyestuff Colour Index Basic Red 54 are suspended in 83 parts of triethylene glycol and the suspension is ground for 6 hours in a sand mill. The dyestuff does not settle out from the preparation so obtained and the physical and chemical properties remain unaffected for several months even at a temperature of 60° C.

EXAMPLE 6

54 Parts of the red dyestuff Colour Index Basic Red 60 that has been purified, freed to a large extend from inorganic salts, dried and ground, are subjected to grinding for eight hours together with 246 parts of ethylene glycol and 300 parts by volume of Ottawa sand. The viscosity is then about 200 cp (measured with the "Viskospatel" according to Rossmann), and after centrifuging the ground material, which still flows well, displays no sedimentation. After the grinding element has been removed, the suspension obtained remains physically and chemically stable for several months even at an elevated temperature (+60° C.).

EXAMPLE 7

The following four dyestuffs are stirred successively into 143 parts of 1,2-propylene glycol: 9 parts of the dry blue dyestuff of the formula

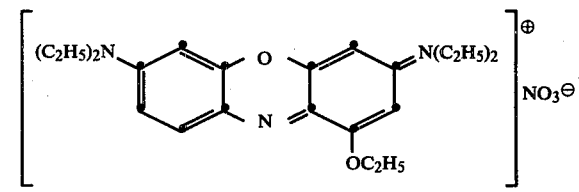

13 parts of the dry red dyestuff of the formula

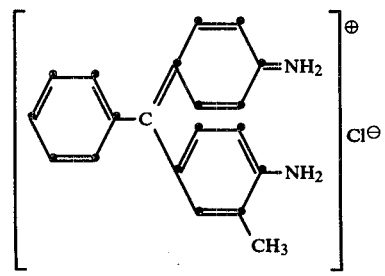

11 parts of the dry dyestuff Colour Index Basic Brown 14 and 17 parts of the dry green dyestuff of the formula

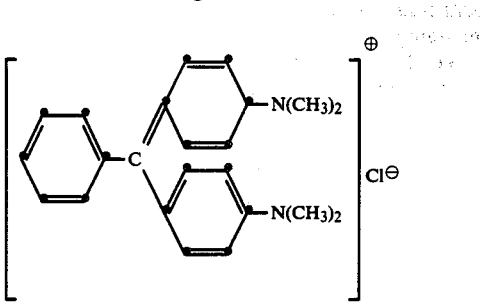

This mixture is ground in a sand mill for 40 minutes. The grinding elements are removed and a mobile, stable dispersion is obtained that displays no physical or chemical change after three months' storage. Liquid preparations having similar properties may be obtained by replacing the propylene glycol with the same number of parts of diethylene glycol, diethylene glycol monoethyl ether or thiodiglycol, and following the procedure described above.

EXAMPLE 8

8 Parts of the dry blue dyestuff of the formula

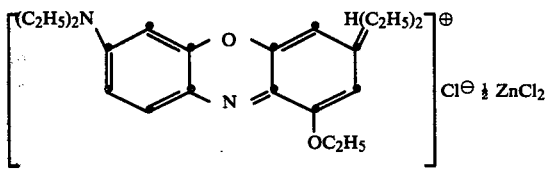

39 parts of the dry red dyestuff Colour Index Basic Red 54 and 17 parts of the green dyestuff of the formula

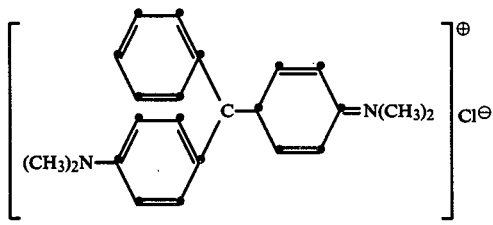

are stirred successively into 76 parts of ethylene glycol. 350 Parts of sand are then added to the batch. The mixture is ground for six hours in a sand mill and the sand is then removed by filtration. A mobile, stable dispersion is obtained that shows no change after storage for several months at 40° C.

EXAMPLE 9

16 Parts of the dry red dyestuff of the formula

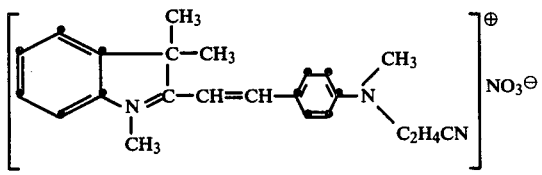

are stirred into 134 parts of ethylene glycol; 400 parts of sand are then added and the mixture is ground in a sand mill for 15 hours. 10 Minutes before the end of the grinding period, 2 parts of a non-ionic surfactant, prepared by additively combining 1.8 parts of ethylene oxide with 1 part of para-tert.-octylphenol, are added to the batch. The batch is filtered and a mobile, stable dispersion is obtained which shows no change after several months' storage.

EXAMPLE 10

30 Parts of the dry red dyestuff of the formula

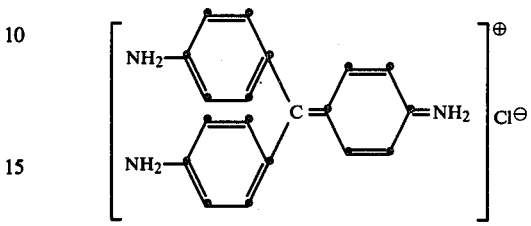

are stirred into 180 parts of dipropylene glycol. 600 Parts of sand are then added to the batch and the mixture is ground for 10 hours in a sand mill. The batch is filtered and a mobile, stable dispersion is obtained that shows no change after storage for several months at 40° C.

A stable dispersion having similar properties is obtained by replacing the 180 parts of dipropylene glycol by 180 parts of triethylene glycol and proceeding as described above.

We claim:

1. A stable, liquid, concentrated dyeing composition, consisting essentially of from 10% to 80% of at least one water-soluble basic dyestuff which is substantially free of inorganic salts, having a mean particle size of 0.1 to about 20 microns, dispersed in from 90% to 20% of an organic dispersion medium in which the dyestuff is insoluble, said dispersion medium consisting essentially of a water-soluble, liquid, organic solvent selected from the group consisting of polyhydric alcohols and ethers thereof, or mixture thereof with up to 20% water, wherein said dispersion medium has a boiling point above 80° C., and wherein said dyeing composition has a viscosity of 100 to about 250 cp at 20° C.

2. The composition of claim 1, wherein the organic solvent is water-miscible.

3. The composition of claim 2, wherein the organic solvent is ethylene glycol.

4. The composition of claim 1, wherein said dispersion medium has a boiling point above 100° C.

5. The composition of claim 1, wherein the dispersion medium contains not more than 5% water.

6. The composition of claim 1, further comprising 0.1 to 3% by weight of an anti-foaming agent.

7. The composition of claim 1, further comprising a non-ionic or cationic surfactant.

8. A process for the preparation of a stable, liquid, dyeing composition, comprising the steps of mixing 10 to 80% of at least one water-soluble basic dyestuff which is substantially free of inorganic salts with 90 to 20% of an organic dispersion medium in which the dyestuff is insoluble, said dispersion medium consisting essentially of a water-soluble, liquid, organic solvent, selected from the group consisting of polyhydric alcohols and ethers thereof, or mixture thereof with up to 20% water, wherein said dispersion medium has a boiling point above 80° C., grinding the mixture in the presence of water-insoluble grinding means to give dyestuff having a mean particle size of 0.1 to about 20 microns, and subsequently removing said grinding means.

9. The process of claim 8, wherein the organic solvent is water-miscible.

10. The process of claim 8, wherein a non-ionic or cationic surfactant and/or 0.1 to 3% by weight of an anti-foaming agent is added to the mixture before the grinding step.

11. The process of claim 8, wherein the grinding is carried out in a ball mill, an attrition mill or a sand mill.

12. The process of claim 8, wherein the grinding is carried out at room temperature.

13. The process of claim 8, wherein the ratio of dyestuff to dispersion medium is between 1:6 and 1:2.

* * * * *